United States Patent [19]
Shea

[11] Patent Number: 5,383,994
[45] Date of Patent: Jan. 24, 1995

[54] METHOD FOR MAKING A DOUBLE WALL FIRE PROOF DUCT

[76] Inventor: Lawrence E. Shea, 165 Lake Dr., San Bruno, Calif. 94066

[21] Appl. No.: 15,254

[22] Filed: Feb. 8, 1993

Related U.S. Application Data

[62] Division of Ser. No. 528,803, May 24, 1990, Pat. No. 5,298,299.

[51] Int. Cl.⁶ ............................................. B65H 81/00
[52] U.S. Cl. .................................... 156/175; 156/169; 156/173
[58] Field of Search ............... 156/161, 162, 169, 173, 156/175, 425

[56] References Cited

U.S. PATENT DOCUMENTS

| | | | |
|---|---|---|---|
| H219 | 2/1987 | Sayles | 156/169 |
| 2,467,999 | 4/1949 | Stephens | 156/173 X |
| 2,614,058 | 10/1952 | Francis | 156/175 X |
| 3,379,591 | 4/1968 | Bradley | 156/173 |
| 3,728,187 | 4/1973 | Martin | 156/162 |
| 4,107,127 | 8/1978 | Shea | 528/129 |

FOREIGN PATENT DOCUMENTS 227554  9/1959  Australia .................... 156/175

Primary Examiner—Jeff H. Aftergut
Attorney, Agent, or Firm—Owen, Wickersham & Erickson

[57] ABSTRACT

A composite plastic duct structure comprised of an outer layer of fabric material impregnated with a fire-resistant resin material and an inner liner layer of chemically corrosion resistant resin material impregnated with a fabric material. The invention includes a method wherein multiple wrappings of resin impregnated material are wound on a mandrel to form the inner and outer layers.

22 Claims, 6 Drawing Sheets

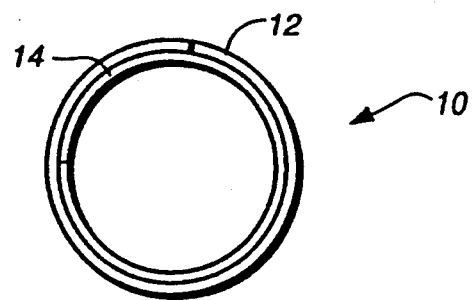
FIG._1
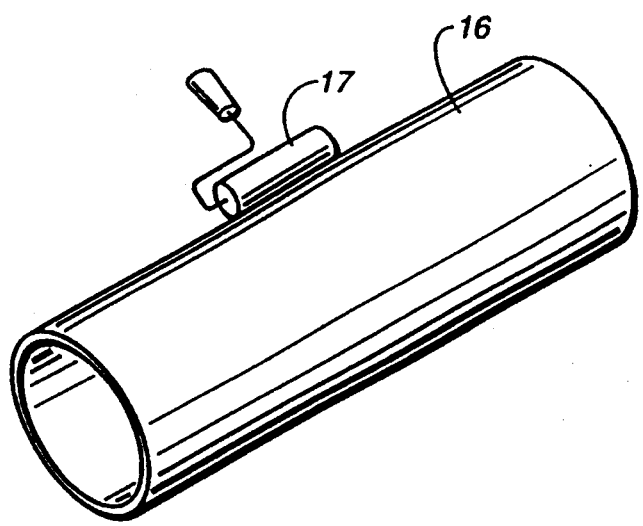
FIG._2
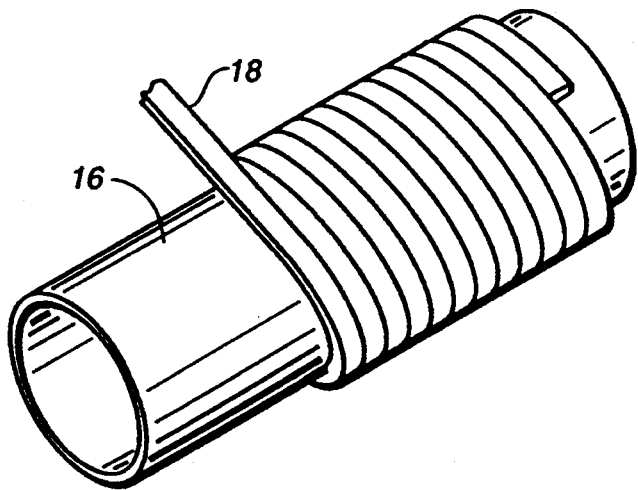
FIG._3

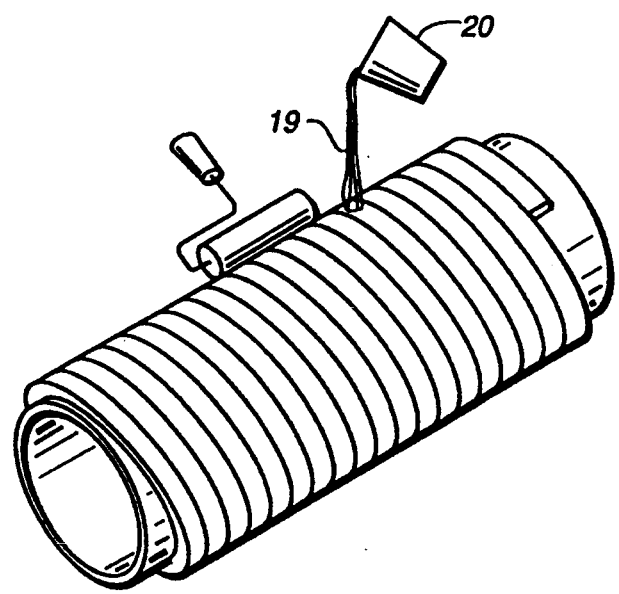
FIG._4
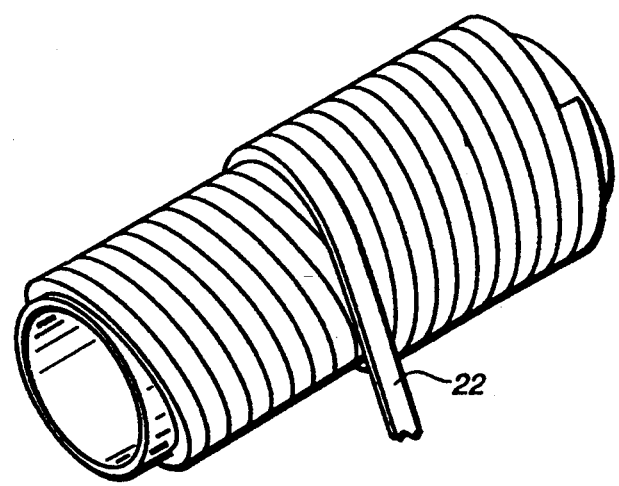
FIG._5
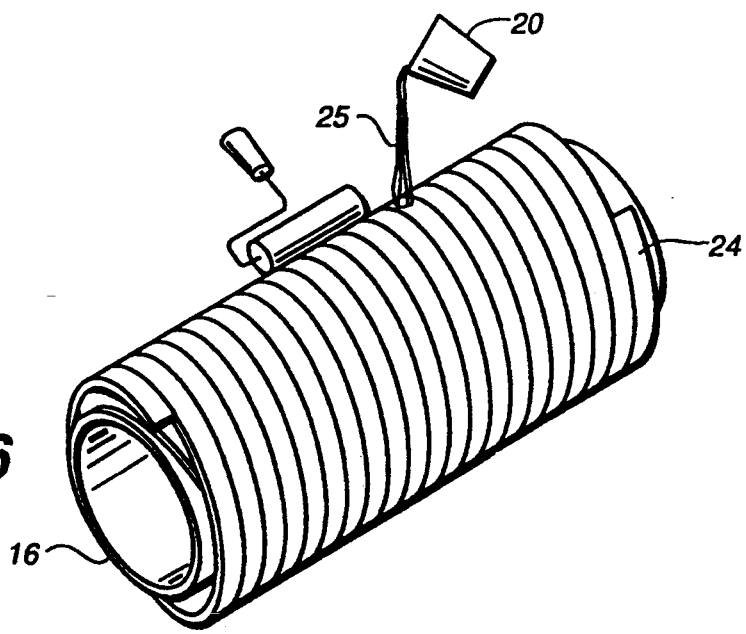
FIG._6

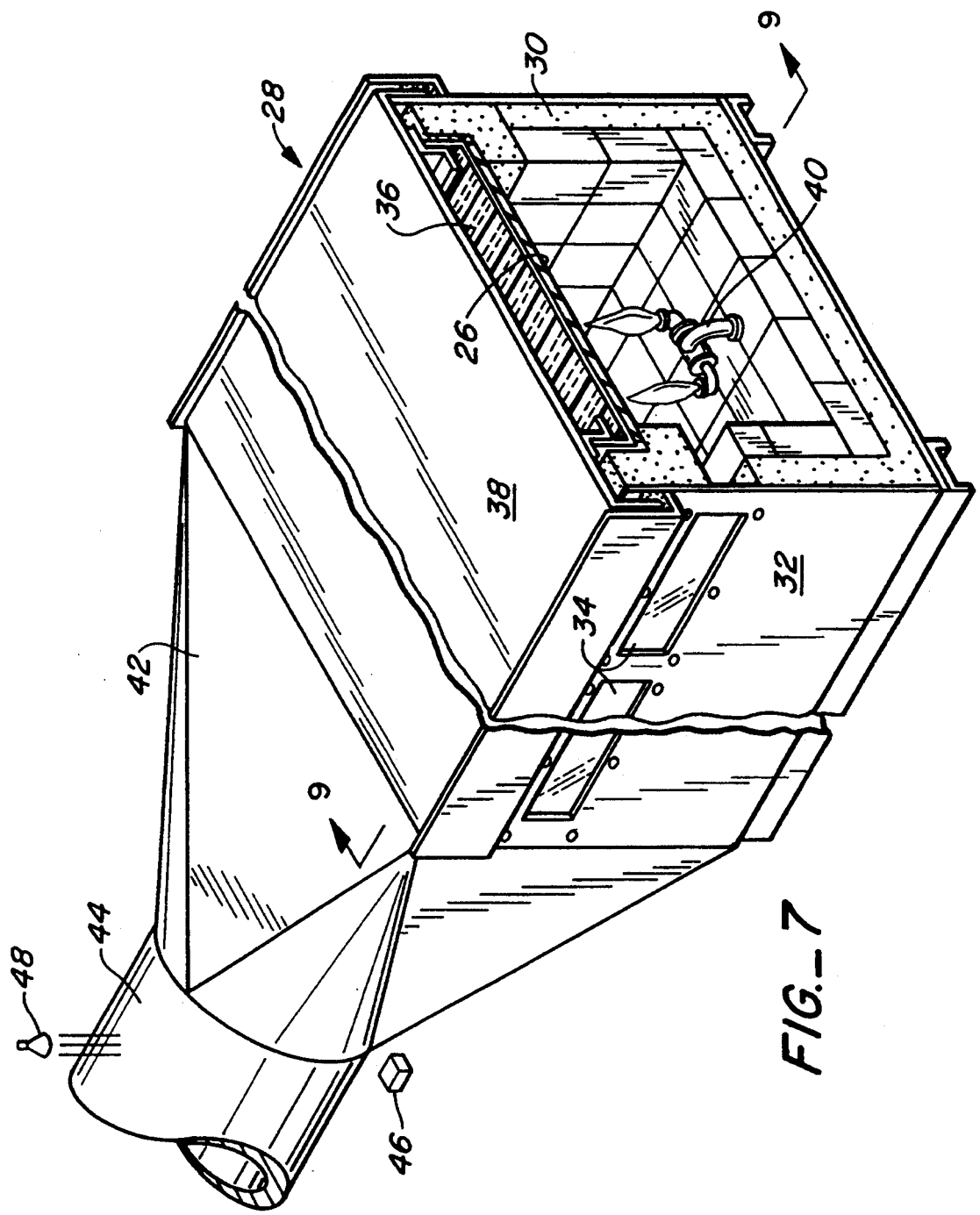
FIG._7

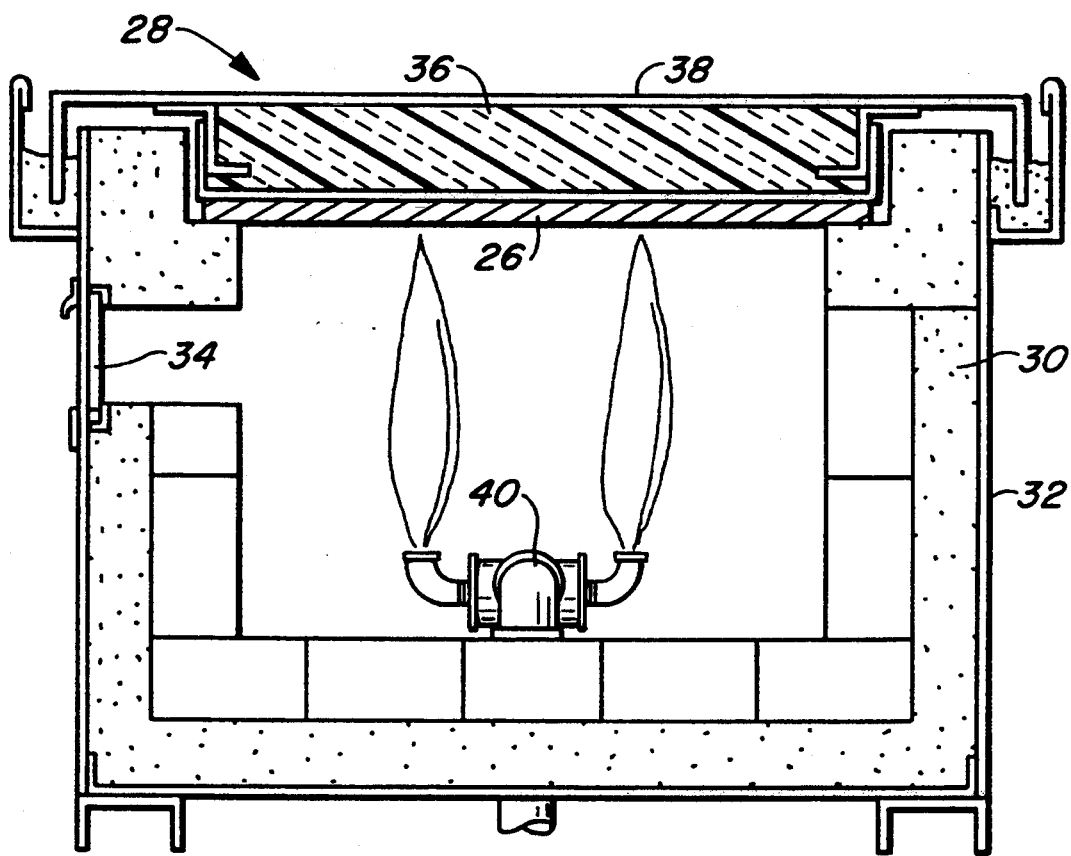
FIG._8

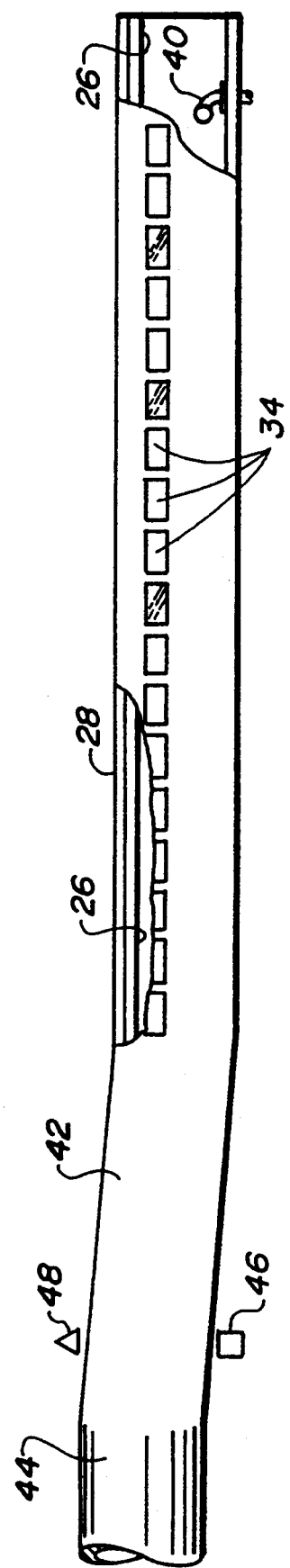
FIG._9

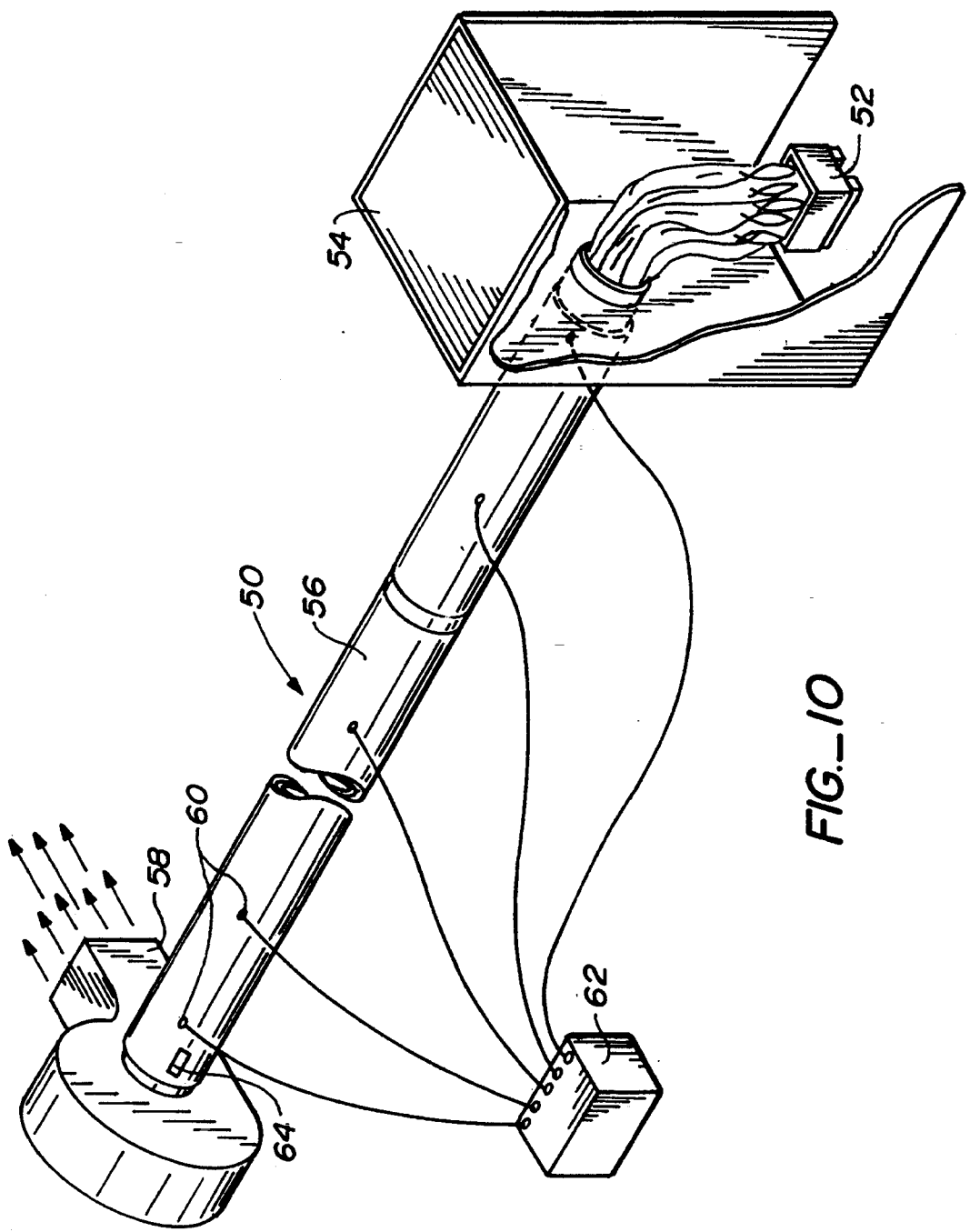
FIG._10

METHOD FOR MAKING A DOUBLE WALL FIRE PROOF DUCT

This application is a division of application Ser. No. 07/528,803, filed May 24, 1990, now U.S. Pat. No. 5,298,299.

This invention relates to fume ducts and a method for making such ducts which are both resistant to deleterious or corrosive chemicals and which are also fire resistant.

BACKGROUND OF THE INVENTION

Ductwork for corrosive vapor exhaust systems is used extensively in many diverse industries which utilize chemicals to process raw materials or perform manufacturing procedures such as the semiconductor industry, the plating industry, the pharmaceutical industry and numerous other industries. Waste water treatment plants also use corrosive chemicals such as chlorine, and caustics, such as sodium hydroxide or sodium hypochlorite in processing sewage, as well as other chemicals. Many research and development labs, and college science buildings also use a great variety of chemicals in conducting experiments in varied fields such as biochemistry, genetics, geological uses, or general chemistry and physics. These chemicals are used for various types of processes or tools, many of which expose personnel in the work environment to hazardous materials. For worker safety, the vapors from these chemicals must be exhausted through air ducts to remove potential contaminants from the work place. Some duct installations can be very large, consisting of many thousands of feet of ductwork which may be manifolded and connected to multiple exhaust fans. Because of the wide diversity of the chemicals used, for various industries, it is exceedingly difficult to provide a single material for ductwork construction which can handle all the chemical exposures which the ducts may face. A great variety of materials have been used heretofore to fabricate fume exhaust ductwork, such as black steel, galvanized steel or stainless steel as well as plastic materials such as polyvinylchloride, polypropylene, coated metals and fiberglass reinforced plastic. In the last forty years the trend in the use of materials has been away from metals or coated metals and toward the use of plastics, the most popular being FRP (fiberglass reinforced plastics).

In the fiberglass fabrication industry, various types of resins have been used over the last three decades. Amongst them are bisphenol fumarates, epoxies, chlorendic anhydrides, isopthalic or orthopthalic resins, and vinylester resins. A problem common to all plastics has been flammability because they can burn rapidly and produce much smoke, creating hazards of their own. Efforts have been made to reduce the flammability of the material by incorporation of various chemical mechanisms such as antimony oxides, boron compounds and heat absorbing fillers, e.g. aluminum trihydrate. Hybrid resins which eliminate the use of styrene have been attempted, such as methyl methacrylate, and various mixes of resins have been tried. The plastics industry often refers to certain classes of materials as "fire-retardant". Commonly these incorporate fillers, heat sinks, such as aluminum trihydrate, and most commonly, halogenated resin systems which complex with antimony or boron compounds. The latter function as free radical traps, thereby depriving the surface fuel of oxygen, and interfering with combustion.

Against this background in the 1970's, resin systems and fume exhaust plastic ducts were developed having excellent fire and smoke properties. Such systems are described in my U.S. Pat. Nos. 4,053,447; 4,076,873; 4,107,127. In general, phenols and similar ring structured molecules are recognized as having excellent fire resistance characteristics and they also generate low quantities of smoke. Phenols, in and of themselves, generally require heat and/or pressure in order to effect their cure. An FRP laminate can be developed with the use of phenolic resins alone. Resorcinol, belonging to the phenol family, reduced or eliminated the necessity for the use of heat and pressure to make ductwork. Various formulations afford cure at ambient (room) temperatures.

As described generally in the above patents, various types of aldehydes used in conjunction with resorcinol, or phenol/resorcinol combinations can be used to effect cure of the resin. An excess of aldehydes to the hydroxyl radicals contained within the mix is necessary. Paraformaldehyde, furfuraldehyde, or other aldehydes can be used alone or in combination with various types of phenol/resorcinol mixes.

In addition to the problem of providing an adequate fire resistant duct material a further and increasingly severe problem arose in producing a duct which is also capable of resisting broad classes of air-borne chemicals.

No one duct material can resist all chemicals used in a wide variety of industries. Certain classes of resins have enhanced properties and resistance to certain families of chemicals. For example, polyesters generally have good resistance to acids and to some degree, on caustics; they generally do not have good resistance to solvents, particularly halocarbons. Epoxies generally have good resistance to caustics and solvents, but do not have the best resistance to strong mineral acids. Other materials such as polyvinylchloride, polypropylene, and other materials exhibit the same characteristics, i.e. good resistance to some chemicals, poor resistance to others.

The same is equally true for various combinations of phenol/aldehyde resins. They have good resistance to most acids, but not to such as concentrated sulfuric acid when used with oxidizers such as hydrogen peroxide. These same resin systems have poor resistance to liquid caustics. In those fume exhaust systems handling these types of materials, the PRF resin systems do not provide the chemical resistance available from alternative resin systems.

Attempting to provide the ideal product is difficult because resin systems with enhanced chemical resistance often have very poor fire retardant performance. On the other hand, those resins with enhanced fire retardant characteristics can have poor resistance to certain types of chemicals. Accordingly, a primary object of the present invention is to solve the aforesaid problem and provide a fume exhaust duct that has both good chemical resistance and good fire resistance characteristics.

Another object of the invention is to provide a method for manufacturing a fume duct which has both good chemical resistance and good fire resistance characteristics.

SUMMARY OF THE INVENTION

In accordance with the principles of the invention a composite fume duct is provided which has an inner liner of chemically resistant material covered by and integral with an outer layer of fire retardant material. Depending on the diameter of the ductwork and its particular use environment, the nominal wall thickness of the duct inner liner is in the range from 30 mil. to 70 mils. but for most applications the liner thickness should be around 50 mils. This limits the amount of potential fuel in the duct while maintaining the necessary chemical resistant barrier. The inner layer is comprised of a layer of fabric material such as fiber glass which is saturated with a chemically resistant resin such as a halogenated vinyl ester. The outer layer which covers the inner layer is similarly comprised of fabric or fiberglass material which is combined with resorcinol or phenol resorcinol type fire retardant resin. The additional layers of glass saturated with PRF resins provide the necessary structural strength in relation to duct diameters which may vary from $\frac{1}{8}$ inch to $\frac{3}{8}$ inch thick overall.

The dual layer duct is formed utilizing a series of method steps which include first coating a mandrel tool with a first chemically resistant resin and then wrapping the mandrel with successive layers of fabric material which is saturated with the first resin. Directly over the first layer the outer fire retardant layer is formed by applying successive layers of a suitable fabric material saturated with the fire retardant resin. The composite two layer duct structure is then allowed to cure and harden before being removed from the mandrel.

Other objects and features of the invention will become apparent from the following detailed description taken in conjunction with the accompanying drawings.

BRIEF DESCRIPTION OF THE DRAWING

FIG. 1 is a view in cross-section of a multi layer fume duct embodying principles of the present invention.

FIGS. 2–6 are a series of diagrammatic views in perspective illustrating various steps used for manufacturing the duct shown in FIG. 1.

FIG. 7 is a view in perspective showing an ASTM "Tunnel Test" apparatus.

FIG. 8 is an end view of the ASTM test apparatus of FIG. 7.

FIG. 9 is a side elevation view in section of the ASTM test apparatus taken along line 9—9 of FIG. 1.

FIG. 10 is a view in perspective of a testing apparatus developed by Factory Mutual Research for testing fume ducts.

DETAILED DESCRIPTION OF EMBODIMENT

With reference to the drawing, FIG. 1 shows a cross-section of a duct 10 embodying principles of the present invention which comprises an outer fire resistant layer 12 and a concentric inner layer 14 that is resistant to many vaporized chemicals. Both of the layers are made of a resin impregnated material in accordance with method steps which are described below. The duct 10 may be made with various diametral sizes, generally in the range of 2 inches to 84 inches of a tubular form and preferably with an overall combined thickness for both layers 12 and 14 ranging from 125 mils. to 375 mils. For most ducts having a standard diameter of 12 inches, the combined thickness is preferably around 125 mils.

The inner layer or liner 14 preferably has a thickness of around 50 mils. for several reasons. First of all, even the best of resin systems when combined with a material such as fiberglass, pose porosity problems. However, by using a liner thickness of 50 mils., any porosity of the liner will be eliminated. Secondly, to provide a liner thickness much greater than 50 mils. tends to increase the quantity or mass of potential fuel and thus increase potential fire problems. Both of these problems are alleviated by restricting the liner thickness to approximately 50 mils. or at most 70 mils. for any diameter of duct.

Since the combined thickness of both layers should be in the range of 125 mils. to 375 mils., the outer layer 12 may have a thickness of from 95 to 345 mils.

As mentioned, each layer 12 and 14 is comprised of a fabric material such as fiberglass which is impregnated with a resin that is cured and hardened to form a rigid structure.

For the inner liner 14 several halogenated chemically resistant resins which are known and commercially available may be described by their generic names, as follows: (1) Vinyl Esters; (2) Chlorendic Anhydrides; (3) Bisphenol Fumarates; (4) Isopthalic Polyester; (5) Orthopthalic Polyester; and (6) Epoxies with aromatic or aliphatic amines.

All of the first five above resins have resistance to acids and caustics but not to solvents, while the alternate #6., the various "Epoxies with aromatic or aliphatic amines" that are available, provide relatively good resistance to solvents and caustics but not as strong a resistance to mineral acids. For an all round, highly effective chemically resistant resin, halogenated vinyl esters are the type most preferred for products according to the present invention.

The outer layer 12 of the duct 10 is made using a fire retardant resin of PRF type comprised of phenol-resorcinol with an excess of aldehydes, as previously described.

The resin systems explained in detail in my prior patents using PRF resins have well demonstrated their fire resistance and low smoke evolution. Ductwork built with resins of this nature have repeatedly been tested by Factory Mutual, and by others, under the Factory Mutual #4922 test protocol. They have repeatedly demonstrated that they do not permit fire to progress along the length of the duct, the ducts do not collapse, and there is very little in the way of smoke evolution.

Ductwork made with these PRF resins are not only approved by Factory Mutual Research for use without sprinklers, but they are also listed by Underwriters Laboratories under their UL-181 test protocol. Part of this latter test protocol is reliance on the ASTM E-84 tunnel Test. In those tunnel tests, the flame spread rating of the duct material using my resins is 5, and the smoke development rating is zero. This duct provided the background and an available source for material that obviously had superior fire resistance. The next problem was how to achieve superior chemical resistance in the previously developed fire-retardant duct. In accordance with the present invention, the answer is to combine the chemical resistant liner 14 with the fire resistant casing 12.

In FIGS. 2–6 a series of steps for making a composite double layer duct 10 having a diameter of 12 inches is shown diagrammatically.

A mold or tool 16 such as a mandrel of approximately 12" O.D. is mounted on a machine and rotated. At this point, in step 1, (FIG. 2) the mandrel is coated with a layer of the selected chemically resistant resin, preferably with a roller applicator 17. Next in step 2 (FIG. 3) a layer 18 of organic veil or fiber glass material, preferably provided in a 6 inch width and saturated with the treated vinylester resin is applied to the coated mandrel in a helical pattern. Additional resin 19 is applied to the first layer, for example by suitable liquid dispensing device 20, as shown in step 3 (FIG. 4). Now, steps 2 and 3 are repeated as steps 4 and 5 to add more layers of veil. A layer of 1½ ounce random glass mat 22 is now also applied and wetted out with the chemically resistant resin. These layers are rolled out completely to make sure that all layers of glass or organic veil material are thoroughly saturated with the resin. Thereafter, an extra layer of random glass mat may be applied to the wetted surfaces of the prior layers of glass; however this additional glass mat is not wetted out completely with the vinylester resin, nor is it rolled out. This technique is known as "dry" final glass or the "wet-on-dry" system. The mass of the precatalyzed vinylester resin is allowed to cure. This latter curing step is not necessary, and a process known as "wet-on-wet" may be used, as explained more fully below. After the vinylester resin cures, construction proceeds in step 6 (FIG. 5) to form the outer layer 12 by applying additional layers 24 of glass, random glass mat, woven roving, boat cloth, filament winding, or organic veils as subsequent layers of glass in order to achieve the appropriate wall thicknesses required, based on the predetermined dimensions of the duct.

For some applications, the aforesaid fabric materials may include graphite or carbon fibers or even ceramic fibers to provide increased strength and fire resistivity. These additional layers are all saturated with PRF resins 25 using various ratios of resorcinol, with or without included phenol, and aldehyde sources such as, but not limited to paraformaldehyde, furfuraldehyde or a formaldehyde/methanol mixture comprised of about 55% liquid formaldehyde, about 35% methonol, and about 10% methoxymethanol and available commercially as Methyl-Formcel. Again, the PRF resins may be applied with suitable dispensing apparatus 20. The outer layers of fabric are preferably applied by helical winding as described with smoothing done by fiber glass rollers 17 (FIG. 6).

When the PRF resin/glass overlays 12 of the casing occurs, it prevents exposure of the vinylester glass layers 14 to air. This then prevents air inhibition of cure of the underlying mass of vinylester/glass/organic veil matrix. Such a method of fabrication avoids the problem of air inhibition and lack of cure of the ester resin in the inner layer 14 for the overall composite 10.

An alternate way of preparing the composite structure is the "wet-wet" process. In this process, the liner materials 18 consisting of organic or inorganic veils and a layer of mat are wetted out with the liner resin system. A layer of dry random glass mat is placed on top of the last layer of glass impregnated with the chemical resistant liner resin. Rather than waiting for this to cure and become hard, the fire-resistant resin is applied directly over the wetted liner material, using a second layer of random glass mat, plus additional glass materials. This is the preferred method because, contrary to expectations, there appears to be a chemical bonding between the dissimilar resin systems and peel strength is increased at least two-fold. In addition, the chemical resistance of the liner is not diminished as would be expected.

There are additional additives which may be incorporated in the resin systems to achieve viscosity control, glass wet-out, glass bonding, and prevention of fisheye.

For example, viscosity control may be achieved in the various resins through the use of fumed silica, Fuller's earth or the addition of acetones, ketones or other halogenated or non-halogenated alcohols. Using dissimilar resin systems in conjunction with each other can cause problems, since one resin can contaminate the other. The fire resistance of the PRF resins may be eliminated or reduced, and in reverse, the chemical resistance of the vinylester resins may be debased. All of these problems notwithstanding, the present method, as described has made it possible to build a product combining a chemical resistance liner with a fire resistive casing which is highly desireable since, it would be beneficial to users of duct systems. In all embodiments of the invention, dissimilar resins are used on different layers of fabric to produce a fiberglass composite duct. Over the last four decades, a large number of tests have been used to determine the flammability characteristics of plastics, most of which have been proven meaningless. Many such tests used very small samples (1"×5") exposed at various angles to a candle or Bunsen burner for a brief time interval (15 seconds). If the flame progressed along the length slowly, the plastic was identified as slow burning; if it extinguished itself when removed from the flame in a given period of time, it was classed as self-extinguishing.

Such small scale tests were extrapolated to imply that if a duct larger than the 1"×5" sample was built of the same materials, that the same results in a real fire would be achieved.

A larger scale test often relied on is the ASTM E-84 "Tunnel Test". Here, as illustrated in FIGS. 7-9, a piece of candidate material 26 20" wide by 25 feet long is installed in a test tunnel or chamber resting against the "ceiling" of the tunnel. The elongated chamber is lined with fire brick 30 covered by sheet steel 32 and has vision panels 34 along its length to facilitate viewing of the specimen material during tests. At the tunnel ceiling, the specimen material is maintained adjacent an insulating block 36 which is held in place by a removable steel cover 38. A gas burner 40 is provided at the tunnel entrance. The opposite end of the tunnel is connected through a reducer section 42 to a draft chamber duct 44. A gas flame from below impinges on the test material for approximately the first 5½ feet of the material. The speed with which the test sample will burn is calibrated on a time basis, and compared against cement asbestos board, which has a flame spread rate of zero. It is also compared against red oak lumber, which burns the total length of the tunnel; this establishes a flame spread rating of 100. Under current testing standards, plastic materials are tested against the norms of the cement asbestos board and the red oak lumber to determine their relative flame spread rate. Depending upon the plastic used, flame spread rates of plastics can range from 10 to 1500, the latter being almost explosive in nature.

The same ASTM E-84 tunnel test device has the capability of evaluating the smoke generation of a substitute plastic product against the norms of the cement asbestos and red oak wood. Across the draft chamber duct 44, a photoelectric cell 46 measures the degree of obscurity created by the smoke generated from the candidate sample material. This cell 46 is located at a window on one side of the duct 44 while a light source 48 is provided at the opposite side. The cement asbestos board generates no smoke that is visible to the photoelectric cell and has a rating of zero; the quantity of smoke generated by the red oak lumber is arbitrarily established at 100. An automatic device, consisting of a pen and a chart (not shown) connected to the photoelectric device can translate the relative obscurity of smoke to an area relationship on the chart. In this manner, the amount of smoke given off quantitatively for the specific time period of the test can be measured.

Over a period of time, plastics became the more common materials used for ductwork in many industrial processes, since the corrosive nature of the effluents more often than not were not adequately handled by metallic materials. By the late 1960's and early 1970's, insurers began to require internal fire sprinklers in plastic ductwork because of large fire losses. Near the end of this time period Factory Mutual Research (FM), associated with a number of large industrial insurers, developed a Duct Test Standard Number #4922 which they and their associated mutual insurers felt were more predictive of real world results when plastic ducts are involved in fire. Other insurers have adopted the FM #4922 Test as their own criteria to determine whether or not plastic ductwork should have sprinklers on their interior.

The FM test utilizes an apparatus 50 as shown in FIG. 10. Here, a flame from a pan of heptane 52 is generated within an enclosure 54 and pulled into one end of a 12" round by 24 foot long duct 56. At the opposite end, an exhaust fan 58 sucks the flame into the duct 56, which simulates an exhaust duct system. A series of thermocouples 60 are spaced apart along the duct 56 and are connected to a recorder 62. The test is a go/no-go criteria. To pass the test, the duct may not burn from one end to the other in a period of 15 minutes; and a thermocouple sensor near the fan end may not register 1000° F. A sight hole 64 located 23 feet from the fire end should not exhibit any flame. If the non-metallic duct cannot pass this criteria, then the non-metallic ductwork must have sprinklers installed on their interior by Factory Mutual standards.

With the broadening use of so-called clean rooms as used in the semiconductor industry, Factory Mutual modified their tests to take another criteria into consideration; i.e., the exterior of the duct should not be permitted to smoke excessively, nor should the duct be permitted to collapse. The reason for these requirements was that air within clean rooms is recirculated at a very high rate. Thus, for ductwork installed in the vicinity of the clean rooms, smoke from the exterior of the duct during a fire would be circulated into the clean room area and if the duct collapsed, exhaust from the area would be impossible. Such conditions would contaminate products contained within the clean room, its equipment, and the clean room surfaces themselves resulting in extensive damage costs. Therefore, the fire and smoke properties of plastic exhaust ducts became increasingly important as the cleanliness requirements for clean room environment increased.

Following are examples of duct parts made in accordance with the principles of the invention together with a resume of the results of subsequent tests of the fabricated parts.

EXAMPLE 1

Various small ducts and elbows (8" diameter and smaller) were constructed using the technique described above relative to FIGS. 2-6, i.e. organic veils 18 and mat with the vinylester resin to form an inner liner 14, and an overlaid casing 12 of PRF/FRP materials. After cure, the parts were removed from the molds. Thereafter, chemical resistance tests were performed to determine whether or not the construction, additives and cure method used with the vinylester resins had any negative influence on their chemical resistance. Tests for chemical resistance included the following reagents:

75% Sulfuric Acid

1:1 V/V Concentrated Sulfuric Acid with 30% hydrogen peroxide

50% V/V Sulfuric Acid

Concentrated Ammonium Hydroxide

The interior surfaces of the duct were kept flooded with these chemicals for a period of time. Microscopic examination was made at the end of the test on the interior surfaces to seek evidence of defect or deterioration.

A method was devised to determine if any bleeding occurred through the wall of the composite structure. Chemical reagents were analyzed for changes in state. The chemical resistance tests produced satisfactory results, i.e. no chemical degradation of duct structure.

EXAMPLE 2

After preliminary chemical resistance screening tests were conducted, the product 10 having outer and inner layers 12 and 14 was evaluated for fire resistance capabilities. A number of products were fabricated for this purpose.

Sixty feet of 12" diameter duct and an elbow were fabricated in the above described manner as shown in FIGS. 2-6 wherein the chemically resistant resin was Dow #510A vinyl ester resin and the fire retardant resin was ATS Fire Ban ®. Using the Factory Mutual #4922 Duct Test, both the horizontal, and combination vertical/horizontal duct tests were performed.

In the horizontal test, a 12" round by 24 foot long duct was set up on hangers. A pan of heptane was used as a fuel source and placed at one end of the duct. At the opposite end of the duct an exhaust fan drew air into the duct. The fire was lit off and drawn into the tube. As stated previously, in the FM test, it is required that the tube shall not burn from one end to the other, fire should not be seen through the sight hole near the fan inlet, nor may the thermocouple at the 23'6" location away from the fire (just prior to the fan) show a temperature rise exceeding 1000°. In this actual test, the first few lineal feet of duct had some minor burning, however, no fire was seen anywhere near the fan inlet; the duct did not collapse, and the temperature rose to only approximately 800° F. for a short period of time. Only the first 5 to 6 lineal foot of duct near the fire end appeared to have been affected by the fire. Beyond that point, the internal liner 14 was scorched and carbonized, but it did not outgas sufficiently to cause subsequent burning on the interior of the duct. The smoke that was generated on the interior of the duct was confined by the outer casing and discharged by the fan for approximately 8 minutes out of the 15-minute duration of the test. Thereafter no more smoke was generated by the interior of the duct. The exterior of the duct did not have any material smoke evolution, and this product passed the Factory Mutual duct test. It was deemed unnecessary to install internal sprinkler protection in this duct by FM, and it is rated by FM to be a smoke removal duct because it did not collapse during the fire test.

EXAMPLE 3

On the FM vertical/horizontal duct test using a section of the 12" diameter duct 10 used in Example 2, the fire source was placed at the base of a 15 foot vertical section of duct. This, in turn, was connected to a 90° elbow, and an additional 24 feet of horizontal duct was used prior to the connection to the fan. The same test result parameters pertained to this type of test, i.e. the fire should not progress to the fan inlet; fire should not be seen near the fan inlet; and the temperature near the fan inlet should not rise to 1000° F. The test was conducted for 15 minutes. Again, in the test results, only a few lineal feet of the vertical section directly impacted by flame impingement responded to the approximate 1800° F. flame front. Smoking on the interior of the duct occurred for only a limited period of time; however, it was confined by the exterior casing. Flaming did not appear to extend beyond the first 6 to 7 lineal feet of the duct, and there was no subsequent flaming on any of the duct from that point to the fan inlet, either on the interior or exterior of the duct. The maximum temperature rise immediately before the fan was approximately 700° F.

On both the horizontal and vertical/horizontal tests, the ductwork beyond 8 lineal feet from the flame end looked as though it had not been involved in a fire at all, i.e., it looked as good after the 15-minute fire test as it did prior to the test.

The Factory Mutual test protocol requires an increase in fan velocity from 600 feet per minute to 2000 feet per minute at the end of the 15-minute fire test. In this test, the additional high velocity was maintained for a period of 10 minutes. The purpose of this is to determine whether or not the ductwork will collapse under the increased negative pressure caused by the higher velocity. The advantage in a duct in not doing so, is that it may receive a special rating by Factory Mutual as a smoke removal duct. In the event of a fire, the exhaust duct will remain serviceable to remove smoke from a piece of equipment to which the duct is connected. This can be exceedingly important in clean room environments where it is important to remove as much smoke as possible.

The ducts 10 according to the present invention, when tested by Factory Mutual procedure as described, passed both test (sprinkler and smoke removal) standards.

To those skilled in the art to which this invention relates, many changes in resins and construction in addition to widely differing embodiments and applications of the invention will make themselves known without departing from the spirit and scope of the invention. The disclosure and the description herein are purely illustrative and are not intended to be in any sense limiting.

What is claimed is:

1. A method for making a composite duct structure for carrying air and gasses having an inner liner of chemically resistant material and an outer layer of fire-retardant material, said method comprising the steps of:
   providing an elongated cylindrical mandrel;
   coating said mandrel with a layer of chemically resistant resin;
   wrapping said mandrel with successive inner layers of fabric material and saturating said inner layers with additional chemically resistant resin;
   rolling said inner layers to form an inner liner of substantially uniform thickness free of air bubbles;
   applying additional outer layers of fabric material directly over said first layers and saturating said second layers with a fire resistant resorcinolaldehyde or phenol-resorcinol aldehyde resin material to form an outer casing around said inner liner material;
   compressing said outer layers to remove any air bubbles; and
   curing said outer layers so that they become integral with said inner liner.

2. The method as described in claim 1 where said inner liner layers are applied wet and allowed to cure before said outer layers and fire retardant resins are applied to form said outer casing.

3. The method as described in claim 1 wherein said inner layers are applied wet, and said outer layers forming said casing with said fire-resistant resin material are applied immediately thereafter while said inner layers are still wet.

4. The method as described in claim 1 wherein the total combined thickness of said inner liner is in the range of 30 mils to 70 mils.

5. The method as described in claim 4 wherein said overall composite wall thickness is between ⅛ inch and ⅜ inch thick.

6. The method as described in claim 1 wherein in lieu of an elongated cylindrical mandrel, a tool of square, rectangular, or other odd shape may be used.

7. The method as described in claim 1 wherein said fabric materials for said inner and outer layers comprise random glass mat, woven roving and filament winding.

8. The method as described in claim 7 wherein said fabric materials for the inner liner may include organic or inorganic veil materials.

9. The method as in claim 1 wherein the liner fabric material is impregnated with a halogenated polyester.

10. The method as in claim 1 wherein the liner material is impregnated with halogenated bisphenol fumarate resins.

11. The method as in claim 1 where the inner liner material is impregnated with halogenated vinyl ester resins.

12. The method as in claim 1 wherein the inner liner fabric is impregnated with halogenated epoxy resins.

13. The method as in claim 1 wherein the outer layer fabric material is impregnated with a resin mixture of resorcinol aldehyde or phenol-resorcinol-aldehydes.

14. The method as in claim 13 wherein the aldehydes include paraformaldehyde.

15. The method in claim 13 wherein the aldehyde is furfuraldehyde.

16. The method of claim 13 wherein the aldehydes included a formaldehyde/methanol mixture.

17. The method of claim 1 where the fabric materials of said inner and outer layers are impregnated with their respective resins of fiberglass reinforcing materials.

18. The method as in claim 1 wherein the fabric materials of said inner or outer layers are impregnated with their respective resin materials and also include graphite or carbon fibers.

19. The method as in claim 1 wherein the fabric material of said inner or outer layers are impregnated with their respective resin materials which also include ceramic fibers.

20. The method as in claim 1 wherein said resins contain fumed silica for maintaining viscosity control when applied to their respective fabric materials.

21. The method as in claim 1 wherein said resins contain Fullers earth for maintaining viscosity control when applied to their respective fabric materials.

22. The method as described in claim 1 wherein said resins contain ketones, or halogenated or unhalogenated alcohols for maintaining viscosity control when applied to their respective fabric materials.

* * * * *